G. BECHER.
FISHING POLE ATTACHMENT.
APPLICATION FILED MAR. 9, 1915.
1,141,684.
Patented June 1, 1915.
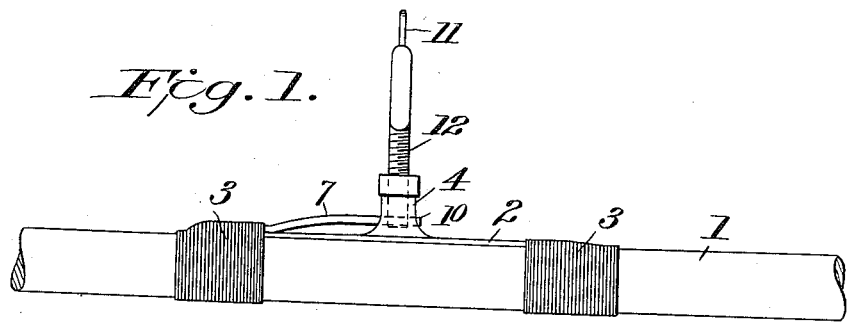
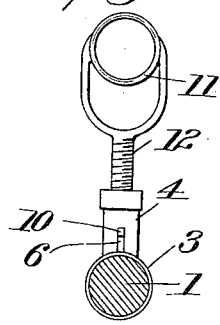
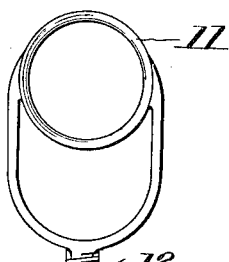
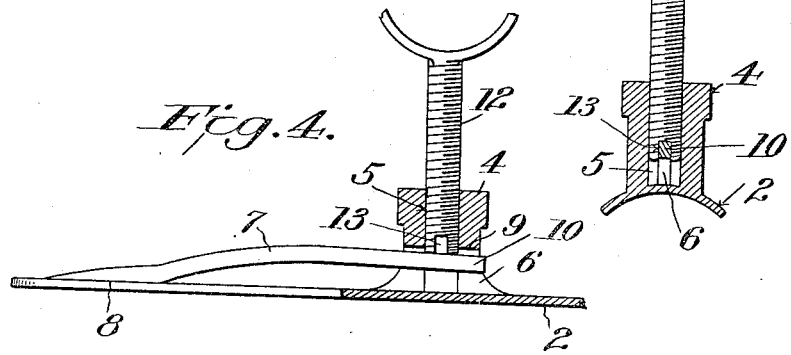
Witnesses
C. H. Walker.
R. P. Binder.
Inventor
George Becher,
By Frederick V. Winters
Attorney

UNITED STATES PATENT OFFICE.

GEORGE BECHER, OF NEW YORK, N. Y.

FISHING-POLE ATTACHMENT.

1,141,684.   Specification of Letters Patent.   Patented June 1, 1915.

Application filed March 9, 1915. Serial No. 13,257.

*To all whom it may concern:*

Be it known that I, GEORGE BECHER, a citizen of the United States, residing at New York city, county and State of New York, have invented certain new and useful Improvements in Fishing-Pole Attachments, of which the following is a full, clear, and exact specification.

This invention relates to attachments for fishing rods, and especially to loops for carrying the line, and it has for its object to provide improved means for attaching such loops to the fishing rod.

The invention is hereinafter described in connection with the accompanying drawings, which constitute a part of this specification, and is then more specifically defined in the claims at the end of the description.

In the accompanying drawings, wherein similar reference characters are used to designate corresponding parts throughout the several views: Figure 1 is the side view of a fishing rod bearing a loop constructed and attached in accordance with this invention. Fig. 2 is an end view, the rod being shown in section. Fig. 3 is an enlarged vertical section through the center of the socketed stud into which the screw threaded shank of the loop is fitted, said loop being shown in elevation, and Fig. 4 is a longitudinal section through the stud bearing plate, showing the position of the shank of the loop just before it becomes locked.

Referring to the drawings by reference 1 designates the fishing pole or rod, and 2 a longitudinal plate fastened to the rod at each end by wound thread or cord 3, or other suitable means. The plate 2 carries a stud 4 preferably arranged at right angles to and integral with said plate. This stud has a screw threaded socket 5 extending at right angles to the plate 2, and a transverse passage 6 in its base extending axially of the plate and intersecting the inner end of the socket 5. A resilient tongue 7 is rigidly fastened at one end to the plate 2, as at 8, at a point well removed from the stud 4. The free end of the tongue, which stands some distance above or away from the plate 2, extends into the passage 6 past the intersection with the passage 5. Said free end of the tongue may be moved toward the plate by pressing it with the finger, but normally the resiliency of the tongue holds its free end firmly in engagement with the upper or outer wall 9 of the passage 6. The portion of the tongue 7 which extends across the socket 5 in the passage 6, is preferably angular in cross section, but the other parts of said tongue may be rounded or of any other desired contour.

The loop 11 has a screw shank 12 adapted to screw into the socket 5 in the stud 4, and the inner end of said shank is provided with an angular notch 13 of a size to receive the angular portion of the tongue 7, as illustrated in Fig. 3. It will be readily understood that when the shank of the loop is screwed in, its inner notched end will, as it passes below the upper wall 9 of the passage 6, depress the free end of the tongue, as shown in Fig. 4, until the notch 13 comes in line with said tongue, whereupon the latter, that is the angular portion 10 thereof, will snap into said notch and effectually lock the loop from being turned in either direction. Of course, said loop may be released and withdrawn or turned out by depressing the tongue with the finger and then turning the loop while said tongue is held down with its free end portion out of the notch 13.

Having thus described my invention, what I claim as new and desire to secure by Letters Patent of the United States is:—

1. The combination with a stud having a screw threaded socket and a transverse passage intersecting with said socket, of a resilient locking tongue extending into said passage across the socket, and a screw threaded shank to fit said socket and having a transverse notch in its end to automatically interlock with the tongue when said shank is screwed into the socket.

2. The combination with a plate to be secured to a fishing pole or other article, of a stud mounted on said plate and having a screw threaded socket and a transverse passage intersecting with said socket, a resilient locking tongue rigidly secured to the plate at a point well removed from the stud and having its free end portion extending into the passage in the stud past the socket, and a screw threaded shank to fit said socket and having a transverse notch in its end to automatically interlock with the tongue when said shank is screwed into the socket.

3. The combination with a stud having a screw threaded socket and a transverse passage intersecting with said socket, of a resilient locking tongue extending into said passage across the socket, and a screw threaded shank to fit said socket and having a transverse notch in its end to automatically interlock with the tongue when said shank is screwed into the socket, said notch and the portion of the tongue which engages it being angular for the purpose specified.

In testimony whereof I have signed my name to this specification in the presence of two attesting witnesses.

GEORGE BECHER.

Witnesses:
 A. HORGEN,
 WM. H. CHRISTIE.